United States Patent
Wagner et al.

(10) Patent No.: US 10,681,184 B2
(45) Date of Patent: Jun. 9, 2020

(54) METHOD AND DEVICE FOR TRANSMITTING A MESSAGE IN A VEHICLE

(71) Applicant: Robert Bosch GmbH, Stuttgart (DE)

(72) Inventors: Marco Andreas Wagner, Leonberg (DE); Michael Poehnl, Wurmberg (DE); Timo Lothspeich, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 561 days.

(21) Appl. No.: 15/232,922

(22) Filed: Aug. 10, 2016

(65) Prior Publication Data

US 2017/0048359 A1 Feb. 16, 2017

(30) Foreign Application Priority Data

Aug. 13, 2015 (DE) .......... 10 2015 215 480

(51) Int. Cl.
*H04L 29/06* (2006.01)
*H04L 29/08* (2006.01)

(52) U.S. Cl.
CPC .......... *H04L 69/08* (2013.01); *H04L 67/12* (2013.01)

(58) Field of Classification Search
CPC .......... H04L 67/08
See application file for complete search history.

(56) References Cited

U.S. PATENT DOCUMENTS

| | | | | |
|---|---|---|---|---|
| 2004/0077309 A1* | 4/2004 | Brass | ........ | H04B 7/155 455/7 |
| 2009/0165032 A1* | 6/2009 | Burke | ........ | H04H 60/73 725/23 |
| 2011/0010460 A1* | 1/2011 | Lavoie | ........ | G06Q 40/04 709/231 |
| 2012/0110204 A1* | 5/2012 | Allen | ........ | G06F 9/541 709/232 |
| 2012/0253551 A1* | 10/2012 | Halimi | ........ | G07C 5/008 701/1 |
| 2012/0316726 A1* | 12/2012 | Schroeck | ........ | H04L 67/125 701/32.7 |
| 2013/0297630 A1* | 11/2013 | DeSanzo | ........ | H04L 67/125 707/756 |
| 2015/0067148 A1* | 3/2015 | Kim | ........ | H04L 67/12 709/224 |
| 2017/0279936 A1* | 9/2017 | Bauer | ........ | H04L 67/12 |

FOREIGN PATENT DOCUMENTS

DE 19832531 2/2000

* cited by examiner

*Primary Examiner* — Moustafa M Meky
*Assistant Examiner* — Sm Z Islam
(74) *Attorney, Agent, or Firm* — Norton Rose Fulbright US LLP; Gerard Messina

(57) ABSTRACT

A method for transmitting a message in a vehicle, in which the message is received according to a source protocol, a communication mechanism which is used by the message and corresponds to the source protocol is converted in such a way that the communication mechanism corresponds to a canonical protocol, the communication mechanism corresponding to the canonical protocol is converted in such a way that the communication mechanism corresponds to a predefined target protocol, and the message is transmitted according to the target protocol.

11 Claims, 3 Drawing Sheets

METHOD AND DEVICE FOR TRANSMITTING A MESSAGE IN A VEHICLE

CROSS REFERENCE

The present application claims the benefit under 35 U.S.C. § 119 of German Patent Application No. DE 102015215480.7 filed on Aug. 13, 2015, which is expressly incorporated herein by reference in its entirety.

FIELD

The present invention relates to a method for transmitting a message in a vehicle. The present invention also relates to a corresponding device, a corresponding computer program, and a corresponding memory medium.

BACKGROUND INFORMATION

According to the related art, highly diverse field busses such as CAN or FlexRay, and occasionally tree, ring, or star topologies are used for transmitting messages between control units (electronic control units, ECUs) and field devices such as sensors or final controlling elements. The different communication mechanisms utilized by the messages therefore require the use of different protocol families, some of which are based on the Internet Protocol (IP); examples of such protocol families are mentioned in the standards IEC 61784-1 and IEC 61784-2, for example.

DE 1983 2531 A1 describes a controller for a large number of electrical consumers in a motor vehicle, in the case of which a simple configuration and a flexible applicability and extensibility is achieved by the fact that each one of the electrical consumers is situated together with a local computer in a consumer module and is controlled within the consumer module by the associated local computer, and that the local computers are linked to a central computer via a data bus and exchange control data in accordance with a standard protocol.

SUMMARY

The present invention provides a method for transmitting a message in a vehicle, a corresponding device, a corresponding computer program, and a corresponding memory medium according to the independent claims.

The approach provided here is based on a canonical protocol in the automotive sector. This canonical protocol is an abstraction shared by highly diverse protocols. Due to this abstraction, it is possible to transmit communication patterns, loss-free, from each of these protocols into the canonical protocol and into other protocols or back again.

The number and diversity of protocols utilized will increase in the future as a result of the vehicle being opened toward the outside world, e.g., due to "C2X" communication, connecting nomadically utilized devices, or connecting to a server infrastructure. This introduction of new protocols will further increase the outlay and the complexity for developing gateways between the technologies. In addition, connecting volatile functionalities introduced from the outside world will usher in new requirements with respect to the dynamics of such gateways.

One advantage of the approach provided here is that it opens up the possibility for adapting the vehicle communication, in an automated and dynamic manner, to a changed vehicle architecture (components, systems, applications and/ or functions) by way of reducing the complexity by simplifying the conversion between the increasing number of protocols. This simplification is achieved by introducing an abstraction layer which is shared by all utilized protocols.

The use of a protocol which is canonical in this sense greatly simplifies the development of gateways. While in the approach used nowadays, an appropriate conversion mechanism into all other potentially arising protocols must be developed whenever a new protocol is introduced, the introduction of a new protocol technology is confined to the design of the abstraction mechanisms with respect to the canonical protocol when a canonical protocol is used. This approach simplifies the development, in particular, in highly complex gateway scenarios having numerous different protocols which must be converted into one another.

Furthermore, the use of the canonical protocol simplifies the development of gateways and protocol stacks which support changes in the communication paths at run time. In combination with the introduction of service-oriented communication, the canonical protocol therefore makes it possible to configure dynamic, self-organizing networks and communication paths. This is an important basis for the design of self-organizing applications in the vehicle. This may also greatly simplify the integration of new functions and components which expand the system at run time.

A dynamically implemented gateway according to the present invention is fully capable of responding to such changes in the communication paths at run time. Generally, such a change according to the related art requires careful planning by the vehicle manufacturer, complex implementation by the manufacturers of the affected system or subsystem, extensive development activity in order to generate new protocol stacks for all control units affected, and a roll-out of the newly developed software. This generally means that the affected vehicle must be left in the workshop and, therefore, that the vehicle will be unavailable to the user.

By comparison, the present invention not only simplifies the development of protocol stacks and, therefore, of gateways in the vehicle, but also opens up the possibility to reconfigure communication paths at run time without the need for work to be performed by a service technician or a software developer. Due to the loss-free transmission of communication contents from one protocol into another protocol, the method also makes it possible to establish a continuous relationship between two functionalities even when they are separated by gateways or are distributed beyond the vehicle boundary.

According to refinements of the present invention, one shared data or service description may be provided. This provides a description mechanism which makes it possible to describe the content of message packets in a way which is independent of the communication technology used. This includes establishing the semantics and the structure of the description. The shared data or service description is designed in such a way that it provides for a simple conversion from or to descriptions of the particular protocols used.

BRIEF DESCRIPTION OF THE DRAWINGS

Exemplary embodiments of the present invention are shown in the figures and are described in greater detail below.

DETAILED DESCRIPTION OF EXAMPLE EMBODIMENTS

Figure 1:
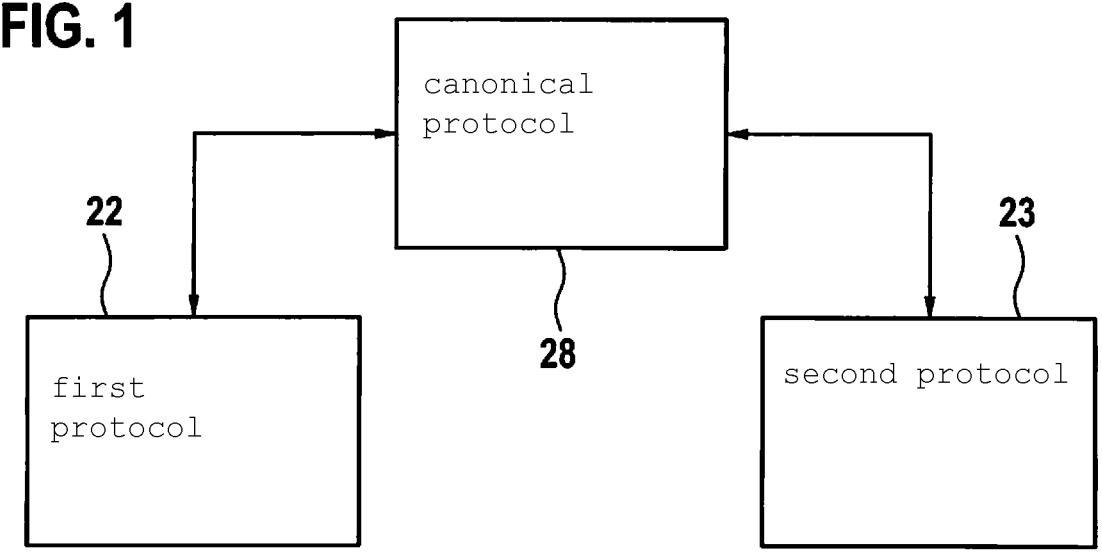
FIG. 1 shows the block diagram of an abstraction and a conversion according to the present invention.
Figure 5:
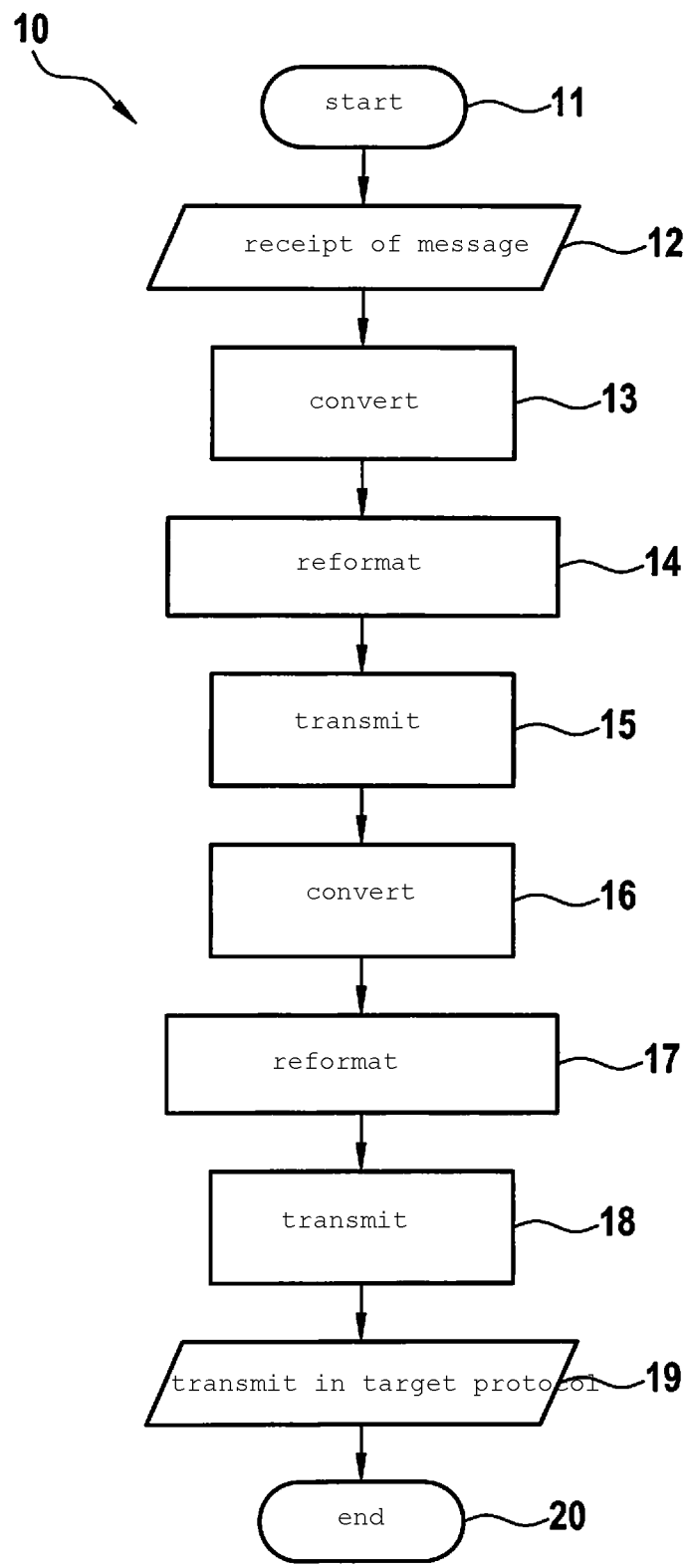
FIG. 5 shows the conversion between the source and target protocols according to the present invention.

FIG. 1 shows one possible gateway structure according to the method of canonical protocol 28 presented here. In this case, communication mechanisms, which are implemented in a first protocol 22, for example, are abstracted in such a way that they correspond to the mechanisms of canonical protocol 28. A gateway, which converts between first protocol 22 and second protocol 23, would contain not only the stacks of first protocol 22 and second protocol 23, but also an implementation of canonical protocol 28. The communication events occurring on first protocol 22 and on second protocol 23 are abstracted and are therefore transmitted loss-free into canonical protocol 28. The further transmission into second protocol 23 or first protocol 22 also takes place loss-free, so that the entire transmission between first protocol 22 and second protocol 23 may take place loss-free. FIG. 5 shows the transmission between an incoming packet in a source protocol 22, 23 via canonical protocol 28 up to the transmission of the packet from canonical protocol 28 into target protocol 22, 23. In this case, after start 11 and receipt 12 of the message in source protocol 22, 23, the data or service description is converted (13, 16), the data are reformatted (14, 17) into the particular formats, and the communication mechanism used is transmitted (15, 18) into its counterpart. In this way, the message may be transmitted (19) in target protocol 22, 23 before method 10 finally ends (20).

In a further embodiment of the present invention, canonical protocol 28 could contain only a subset of the functions converted in first protocol 22 and second protocol 23, or first protocol 22 and second protocol 23 could provide only a subset of the functions supported by canonical protocol 28. In these cases, the transmission of the functions would be limited to the subset shared by first protocol 22 and second protocol 23.

The approach is usable for an arbitrary number of protocols P which may be converted into canonical protocol 28, where: P=N. A gateway is characterized in that it may convert, via canonical protocol 28, an arbitrary source protocol 22, 23 having quantity P into an arbitrary target protocol 22, 23 having quantity P. In particular, gateway conversions are also possible in which the gateway merely supports a subset of P, or source protocol 22, 23 and target protocol 22, 23 are identical.

Figure 2:
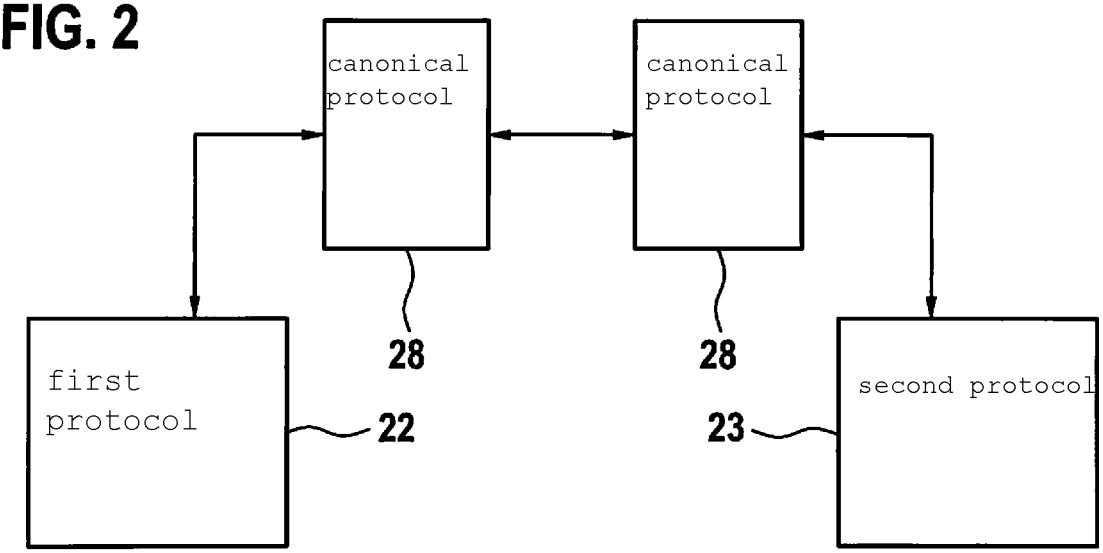
FIG. 2 shows one possible variant of the conversion.

In the variant of the approach illustrated in FIG. 2, the conversion of the messages of first protocol 22 and of second protocol 23 are further decoupled. An additional instance of canonical protocol 28 is integrated for this purpose. As a result, the end points of first protocol 22 and of second protocol 23 may also be instantiated spatially separated from one another. The communication between the two end points then takes place, for example, in canonical protocol 28. In a further variant, further protocol conversions may take place between the two instances of canonical protocol 28.

Figure 3:
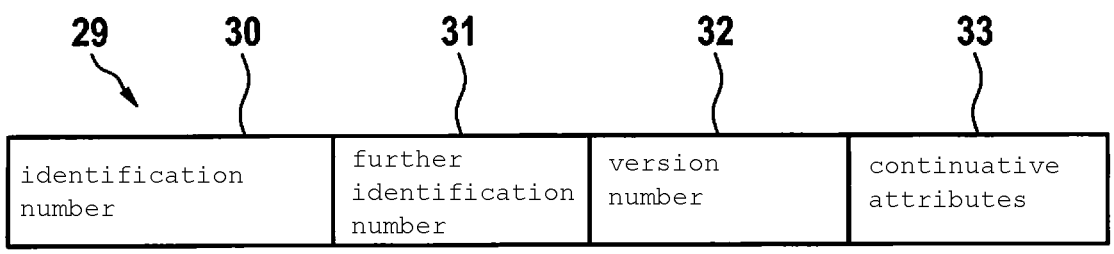
FIG. 3 shows the configuration of a data or service description, by way of example.

In the present specific embodiment, canonical protocol 28 contains a shared data or service description, optionally a shared data model, and a definition of the supported communication mechanisms. FIG. 3 shows such a description 29, by way of example. In this example, this description 29 contains an identification number 30 which describes the content of a message, and a further identification number 31 for unambiguously identifying the data or service provider. In addition, this description 29 has a version number 32 and a field for continuative attributes 33. The structure and contents of the utility data range are stored in the shared data model. This specification is used for ensuring the interoperability between the different protocols 22, 23, 28. In this case, the data model of canonical protocol 28 contains at least the specification of data types used as well as their serialization on the physical medium.

The definition of supported communication mechanisms is a collection of widespread communication patterns, for example, the observer pattern (publish-subscribe) or request and response (request-response). This collection establishes the capabilities of canonical protocol 28 with respect to the support of mechanisms of this type.

The connection of additional protocols 22, 23 is limited to the definition of abstraction rules with respect to canonical protocol 28. As compared to the previous approach in the related art, in which transformation rules must be defined for every further protocol 22, 23 which potentially may be linked, the approach is limited to a few mechanisms. Abstraction mechanisms which must be defined with respect to connecting new protocols 22, 23 to canonical protocol 28 are abstraction rules for data or service description 29, abstraction rules for the data model, and abstraction rules for the communication mechanisms used.

In the automotive sector, the use of a canonical protocol 28 includes connecting automotive networking technologies and protocols 22, 23. These include not only classical bus protocols such as CAN or FlexRay, but also modern, IP-based protocols such as the SOME/IP which is standardized in AUTOSAR. In addition, the increasing linkage of the vehicle toward the outside also makes it necessary to integrate non-automotive protocols, for example, from the domain of the internet of things—possibilities include MQTT or XMPP—or from the IT sector—such as web services, for example. As compared to approaches of similar types from the IT industry, canonical protocol 28 in the automotive sector is distinguished by the adaptation of data or service description 29 as well as the data model to the limited resources of the networks used in the automotive sector and of the connected devices. This requires, in particular, that both IP-based and non-IP-based protocols 22, 23 be depictable on the same canonical protocol 28, whereas conventional approaches focus on IP-based approaches. Within the scope of data or service description 29, an efficient, binary addressing technique which avoids unnecessary overheads and redundancies is therefore recommended. A description 29 based on an XML file, which is common in information technology, would be extremely inefficient within the scope of a communication scenario which contains a CAN connection. In addition, such a description form would place relatively great resource demands on an evaluating device, which would first have to parse and evaluate the description form, which is a complex endeavor. Similar preconditions apply with respect to the data model. In addition to the requirement of simple processability in the sense of serialization or deserialization, it is also recommended in this case that unnecessary overheads due to explicit description techniques such as the XML tags, which are frequently utilized in information technology, be avoided.

Canonical protocol 28 in the automotive sector is also distinguished by the support for system architectures which are specific for automotive technology. This includes, in particular, support for a domain architecture using different communication technologies in the different domains and in the communication between the domains.

Figure 4:
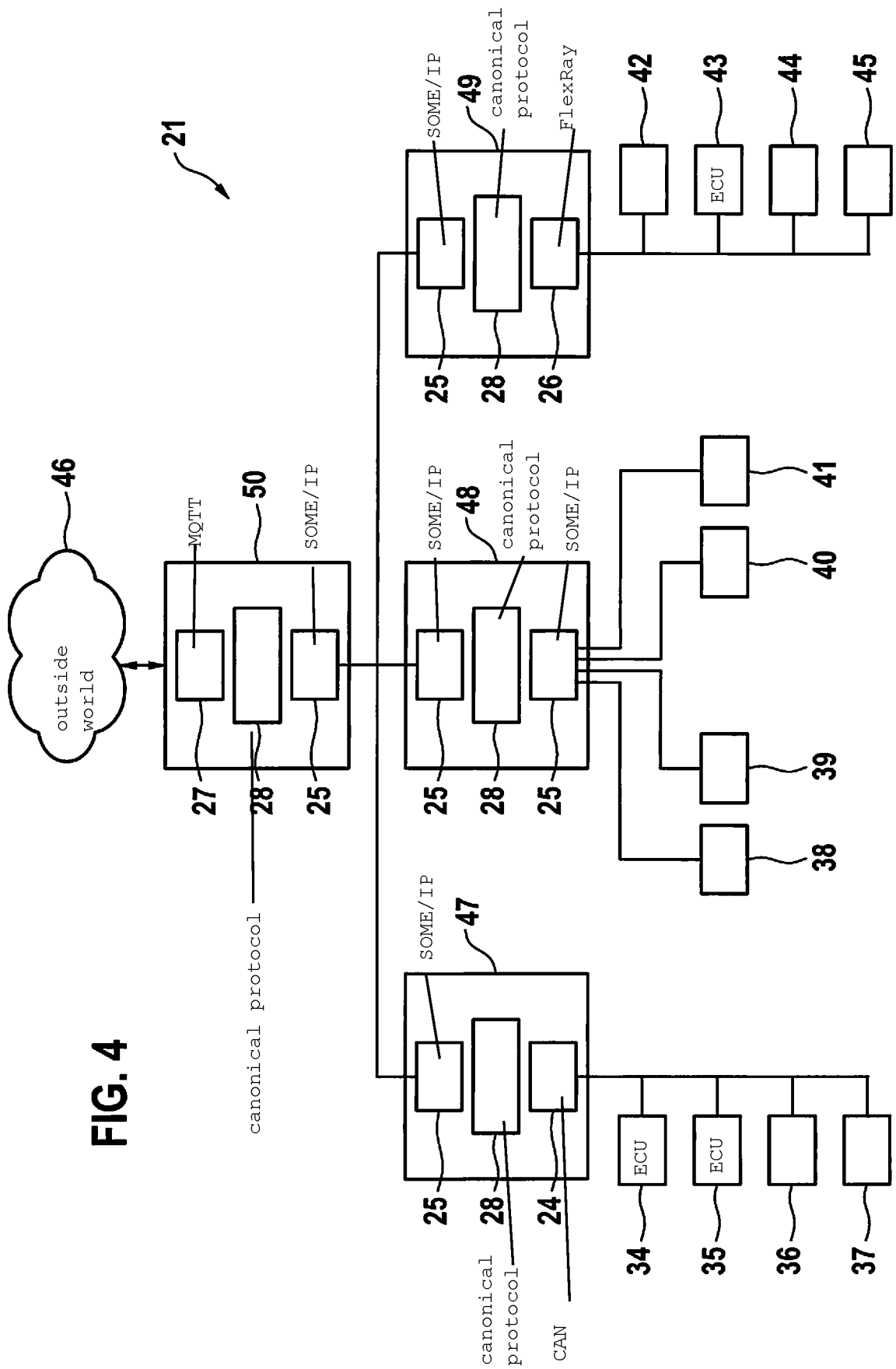
FIG. 4 shows one system architecture, by way of example, using the canonical protocol.

FIG. 4 shows, by way of example, the use of canonical protocol 28 in one possible system architecture of a vehicle 21. The system architecture represented is made up of three domains which are connected to each other by SOME/IP 25. Within the three domains, different communication protocols are utilized: CAN 24, SOME/IP 25 and FlexRay 26. In addition, a central connection unit 50 (connectivity control unit, CCU) is connected to the network. In this example, this CCU 50 communicates with outside world 46 of vehicle 21 using protocol MQTT 27. In the illustrated system architecture of vehicle 21, domain gateways 47, 48, 49 and, therefore, CCU 50 as well, each have an implementation of canonical protocol 28. In addition, domain gateways 47, 48, 49 and, therefore, CCU 50 as well, have implementations of the particular necessary abstraction rules on connected protocol technologies 24, 25, 26, 27.

Two potential communication sequences in the system architecture of vehicle 21 represented in FIG. 4 are now described in greater detail, by way of example: A cross-domain communication and a communication between vehicle 21 and outside world 46.

A data exchange between ECU 34 and ECU 43 shall be considered for the first scenario. In this case, ECU 34 transmits a message having the corresponding content via CAN 24. This message is initially abstracted, in gateway 47, into a corresponding message in canonical protocol 28. In order to now forward this message, gateway 47 now converts the message, which is present in canonical protocol 28, into target protocol SOME/IP 25. This message is then sent to gateway 49, initially abstracted into canonical protocol 28. The message is then converted into the target protocol, which is FlexRay 26 in this case, and is transmitted to ECU 43 via FlexRay 26, the broadcast medium.

In the second scenario to be considered, ECU 35 transmits a data message to a server which is connected via CCU 50. For this purpose, ECU 35 transmits a corresponding message on local CAN 24. This message is initially abstracted by gateway 47 in order to convert it into canonical protocol 28. In a second step, this message is converted into SOME/IP 25 and is transmitted to CCU 50. In CCU 50, in turn, an abstraction into canonical protocol 28 takes place. This message is subsequently converted into MQTT 27 and is transmitted to the server.

What is claimed is:

1. A method for transmitting a message in a vehicle, comprising:
   receiving the message according to a source protocol from a first component in the vehicle;
   converting, by a gateway in the vehicle, a communication mechanism which is used by the message and corresponds to the source protocol in such a way that the communication mechanism corresponds to a canonical protocol;
   converting, by the gateway, the communication mechanism corresponding to the canonical protocol in such a way that the communication mechanism corresponds to a predefined target protocol;
   after receipt, converting, by the gateway, a description of data or a service performed with the aid of the message in such a way that the description corresponds to the canonical protocol;
   converting, by the gateway, the description corresponding to the canonical protocol before transmission in such a way that the description corresponds to the target protocol; and
   transmitting the message according to the target protocol over a communication system in the vehicle, wherein the description excludes any metadata.

2. The method as recited in claim 1, further comprising:
   after receipt, reformatting data of the message corresponding to the source protocol in such a way that the data correspond to the canonical protocol; and
   reformatting the data corresponding to the canonical protocol before transmission in such a way that the data correspond to the target protocol.

3. The method as recited in claim 1, wherein one of:
   the description includes an identification number describing the contents of the message,
   the description includes an identification number for identifying a provider of the data or of the service,
   the description includes a version number, or
   the description includes continuative attributes.

4. The method as recited in claim 1, wherein at least one of:
   the source protocol or the target protocol is CAN,
   the source protocol or the target protocol is SOME/IP,
   the source protocol or the target protocol is FlexRay,
   the source protocol or the target protocol is MQTT,
   the source protocol or the target protocol is AMQP,
   the source protocol or the target protocol is XMPP,
   the source protocol or the target protocol is DDS, or
   the source protocol or the target protocol is CoAP.

5. The method as recited in claim 1, wherein one of:
   the message is received by a control unit of the vehicle, or
   the message is transmitted to a control unit of the vehicle.

6. The method as recited in claim 1, wherein at least one of:
   the message is received by an outside world of the vehicle, or
   the message is transmitted to an outside world of the vehicle.

7. The method as recited in claim 1, further comprising:
   receiving the message according to the target protocol at a second gateway in the vehicle;
   converting, by the second gateway, a communication mechanism which is used by the message according to the target protocol in such a way that the communication mechanism which is used by the message according to the target protocol corresponds to the canonical protocol;
   converting, by the second gateway, the communication mechanism corresponding to the canonical protocol in such a way that the communication mechanism corresponds to a second target protocol; and
   transmitting the message according to the second target protocol to a second component in the vehicle.

8. A non-transitory machine-readable memory medium, on which is stored a computer program for transmitting a message in a vehicle, the computer program, when executed by a computer, causing the computer to perform:
   receiving the message according to a source protocol from a first component in the vehicle;
   converting, by a gateway in the vehicle, a communication mechanism which is used by the message and corresponds to the source protocol in such a way that the communication mechanism corresponds to a canonical protocol;

converting, by the gateway, the communication mechanism corresponding to the canonical protocol in such a way that the communication mechanism corresponds to a predefined target protocol;

after receipt, converting, by the gateway, a description of data or a service performed with the aid of the message in such a way that the description corresponds to the canonical protocol;

converting, by the gateway, the description corresponding to the canonical protocol before transmission in such a way that the description corresponds to the target protocol; and transmitting the message according to the target protocol over a communication system in the vehicle, wherein the description excludes any metadata.

9. The non-transitory machine-readable memory medium as recited in claim 8, the computer program, when executed by the computer, causing the computer to further perform:

receiving the message according to the target protocol at a second gateway in the vehicle;

converting, by the second gateway, a communication mechanism which is used by the message according to the target protocol in such a way that the communication mechanism which is used by the message according to the target protocol corresponds to the canonical protocol;

converting, by the second gateway, the communication mechanism corresponding to the canonical protocol in such a way that the communication mechanism corresponds to a second target protocol; and transmitting the message according to the second target protocol to a second component in the vehicle.

10. A system for transmitting a message in a vehicle, comprising:

a device configured to:

receive the message according to a source protocol from a first component in the vehicle;

convert a communication mechanism which is used by the message and corresponds to the source protocol in such a way that the communication mechanism corresponds to a canonical protocol;

convert the communication mechanism corresponding to the canonical protocol in such a way that the communication mechanism corresponds to a predefined target protocol;

after receipt, convert a description of data or a service performed with the aid of the message in such a way that the description corresponds to the canonical protocol;

convert the description corresponding to the canonical protocol before transmission in such a way that the description corresponds to the target protocol; and transmit the message according to the target protocol over a communication system in the vehicle, wherein the device is a gateway in the vehicle, wherein the description excludes any metadata.

11. The system as recited in claim 10, further comprising:

a second gateway disposed in the vehicle and configured to:

receive the message according to the target protocol;

convert a communication mechanism which is used by the message according to the target protocol in such a way that the communication mechanism which is used by the message according to the target protocol corresponds to the canonical protocol;

convert the communication mechanism corresponding to the canonical protocol in such a way that the communication mechanism corresponds to a second target protocol; and transmit the message according to the second target protocol to a second component in the vehicle.

* * * * *